United States Patent
Shizuku et al.

(10) Patent No.: US 10,522,851 B2
(45) Date of Patent: Dec. 31, 2019

(54) FUEL CELL RESIN FRAME ASSEMBLY

(71) Applicant: TOYOTA JIDOSHA KABUSHIKI KAISHA, Toyota-shi, Aichi-ken (JP)

(72) Inventors: Fumishige Shizuku, Seto (JP); Sachio Okada, Sunto-gun (JP); Takashi Kajiwara, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 87 days.

(21) Appl. No.: 15/616,078

(22) Filed: Jun. 7, 2017

(65) Prior Publication Data

US 2017/0358806 A1    Dec. 14, 2017

(30) Foreign Application Priority Data

Jun. 10, 2016  (JP) .................. 2016-115782
Dec. 14, 2016  (JP) .................. 2016-241749

(51) Int. Cl.
*H01M 8/0273*   (2016.01)
*H01M 8/0254*   (2016.01)
*H01M 8/1018*   (2016.01)

(52) U.S. Cl.
CPC ....... *H01M 8/0273* (2013.01); *H01M 8/0254* (2013.01); *H01M 2008/1095* (2013.01)

(58) Field of Classification Search
CPC ............. H01M 8/0273; H01M 8/1004; H01M 8/0284; H01M 8/0297; H01M 8/0254; H01M 2008/1095
See application file for complete search history.

(56) References Cited

U.S. PATENT DOCUMENTS

2014/0287338 A1*  9/2014  Tanaka ................ H01M 8/1004
                                                                 429/481

FOREIGN PATENT DOCUMENTS

| JP | 2014-072165 | 4/2014 | |
| JP | 2015-050137 | 3/2015 | |
| JP | 2015-115242 | 6/2015 | |
| WO | WO-2015141215 A1 * | 9/2015 | .......... H01M 8/1004 |

* cited by examiner

*Primary Examiner* — Maria Laios
*Assistant Examiner* — Kwang Han
(74) *Attorney, Agent, or Firm* — Finnegan, Henderson, Farabow, Garrett & Dunner, LLP

(57) ABSTRACT

A relation of $X \times \Delta T \times CTE_f < L \times t$ is satisfied, where X represents a distance between a circumferentially innermost position of a bonded portion of a resin frame bonded to first projections of separators and a circumferentially inner end of the resin frame; L represents a distance between the circumferentially inner end of the resin frame and a circumferentially outermost position of a held portion of a membrane electrode gas-diffusion-layer assembly that is interposed and held between second projections of the separators: $\Delta T$ represents a temperature difference from a low temperature T1 of −40° C. to a high temperature T2 of 100° C. $CTE_f$ represents an average coefficient of linear expansion of the resin frame within a range of the low temperature T1 to the high temperature T2; t represents a breaking elongation of the electrolyte membrane at the low temperature T1; and the distances X, L represents dimensions at the high temperature T2.

2 Claims, 3 Drawing Sheets

HIGH TEMPERATURE T2

LOW TEMPERATURE T1

FIG. 4A

| X [μm] | X·ΔT·CTEf [μm] | L [μm] | 50 | 200 | 400 | 600 | 800 |
|---|---|---|---|---|---|---|---|
| | | L × t [μm] | 13 | 50 | 100 | 150 | 200 |
| 1 | 5 | | O | O | O | O | O |
| 3 | 16 | | x | O | O | O | O |
| 5 | 27 | | x | O | O | O | O |
| 7 | 37 | | x | O | O | O | O |
| 10 | 53 | | x | O | O | O | O |

$X \times \Delta T \times CTE_f < L \times t \quad \ldots (1)$
$\Delta T = 140, CTE_f = 38 \text{ ppm}, t = 0.25$

FIG. 4B

| X [μm] | X·ΔT·CTEf [μm] | L [μm] | 50 | 200 | 400 | 600 | 800 |
|---|---|---|---|---|---|---|---|
| | | $(1 - \Delta T \times CTE_m) L \times t$ [μm] | 12 | 50 | 99 | 149 | 198 |
| 1 | 5 | | O | O | O | O | O |
| 3 | 16 | | x | O | O | O | O |
| 5 | 27 | | x | O | O | O | O |
| 7 | 37 | | x | O | O | O | O |
| 10 | 53 | | x | O | O | O | O |

$X \times \Delta T \times CTE_f < (1 - \Delta T \times CTE_m) L \times t \quad \ldots (2)$
$\Delta T = 140, CTE_f = 38 \text{ ppm}, t = 0.25, CTE_m = 60 \text{ ppm}$

FUEL CELL RESIN FRAME ASSEMBLY

INCORPORATION BY REFERENCE

The disclosure of Japanese Patent Application No. 2016-115782 filed on Jun. 10, 2016 and Japanese Patent Application No. 2016-241749 filed on Dec. 14, 2016, each including the specification, drawings and abstract, is incorporated herein by reference in its entirety.

BACKGROUND

1. Technical Field

The present disclosure relates to a unit cell of a fuel cell.

2. Description of Related Art

Japanese Patent Application Publication No. 2015-115242 discloses a unit cell of a fuel cell. This unit cell has a structure that includes a membrane electrode gas-diffusion-layer assembly (MEGA) and a resin frame bonded to an outer circumference of the MEGA, and interposes and holds the MEGA with the resin frame between a pair of separators. In the outer circumference of the MEGA bonded to the resin frame, an electrolyte membrane Is exposed with gas diffusion layers omitted, and the resin frame is bonded onto the exposed electrolyte membrane.

SUMMARY

Unit cells of fuel cells may be used in a wide range of temperature conditions from a low temperature below the freezing point to a high temperature of more than 70° C. The inventor of the present application has found that in an environment having such a great temperature difference, a tensile stress is locally applied to an electrolyte membrane due to shrinkage of a resin frame when the temperature drops to a low level, thus probably resulting in breakage of the electrolyte membrane.

An aspect of the present disclosure is directed to a unit cell of a fuel cell, and the unit cell includes: a membrane electrode gas-diffusion-layer assembly including a membrane electrode assembly having an electrolyte membrane and gas-diffusion layers provided on both faces of the membrane electrode assembly; a resin frame in a frame shape, the resin frame bonded to an outer circumferential region of the membrane electrode gas-diffusion-layer assembly; and two separators holding therebetween the membrane electrode gas-diffusion-layer assembly to which the resin frame is bonded, the separators each having projections and recesses. In the unit cell of the fuel cell no gas-diffusion layers are formed on the membrane electrode assembly in the outer circumferential region of the membrane electrode gas-diffusion-layer assembly to which the resin frame is bonded, and the resin frame is bonded onto the electrolyte membrane or onto an electrocatalyst layer formed on the electrolyte membrane. When, of the projections and the recesses of the two separators, portions in contact with the membrane electrode gas-diffusion-layer assembly to which the resin frame is bonded are referred to as projections, and portions apart from the membrane electrode gas-diffusion-layer assembly are referred to as recesses; the separators include first projections and second projections as the projections; the outer circumferential region of the membrane electrode gas-diffusion-layer assembly to which the resin frame is bonded is disposed in spaces formed by the recesses of the two separators that face each other; the resin frame is interposed and held between, and is bonded to the first projections of the two separators that face each other, the first projections located more circumferentially outward than the recesses; and the membrane electrode gas-diffusion-layer assembly is interposed and held between the second projections of the two separators that face each other, the second projections located more circumferentially inward than the recesses. In a cross section of the unit cell that is cut at any position in a side of an outer shape of the membrane electrode gas-diffusion-layer assembly in section vertical to a direction of the side thereof, a relation of $X \times \Delta T \times CTE_f < L \times t$ is satisfied, where X represents a distance between a circumferentially innermost position of a bonded portion of the resin frame that is bonded to the first projections and a circumferentially inner end of the resin frame; L represents a distance between the circumferentially inner end of the resin frame and a circumferentially outermost position of a held portion of the membrane electrode gas-diffusion-layer assembly that is interposed and held between the second projections; $\Delta T$ represents a temperature difference from a low temperature T1 of $-40°$ C. to a high temperature T2 of $100°$ C.; $CTE_f$ represents an average coefficient of linear expansion of the resin frame within a range of the low temperature T1 to the high temperature T2; t represents a breaking elongation of the electrolyte membrane at the low temperature T1; and the distances X, L represents dimensions at the high temperature T2. According to this configuration, the structure of the unit cell of the fuel cell satisfies the relation of $X \times \Delta T \times CTE_f < L \times t$, therefore, it is possible to reduce probability of breakage of the electrolyte membrane when the temperature drops to the low temperature T1 and the resin frame shrinks.

In the aforementioned unit cell a relation of $X \times \Delta T \times CTE_f < (1 - \Delta T \times CTE_m) L \times t$ may be satisfied, where $CTE_m$ represents an average coefficient of linear expansion of the electrolyte membrane within the range of the low temperature T1 to the high temperature T2. According to this configuration, the distance L regarding the electrolyte membrane satisfies a further severe condition; therefore, it is possible to further reduce probability of breakage of the electrolyte membrane when the temperature drops to the low temperature T1 and the resin frame shrinks.

The present disclosure may be implemented by various aspects, and for example, may be implemented by an aspect of a fuel cell, a manufacturing method thereof, and others.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a drawing showing examples of dimensions satisfying a formula regarding the structure of the unit cell; and FIG. 4B is a drawing showing examples of dimensions satisfying a formula regarding the structure of the unit cell.

DETAILED DESCRIPTION OF EMBODIMENTS

Figure 1A:
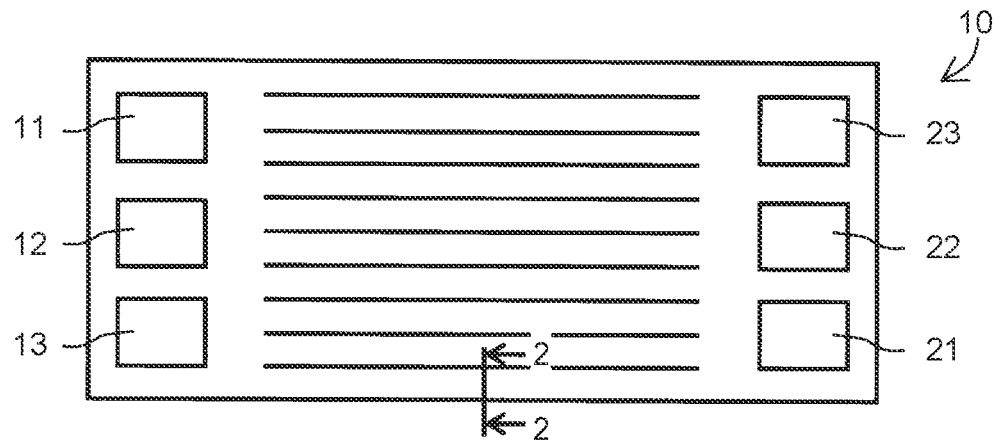
FIG. 1A is an explanatory view showing a configuration of a unit cell of a fuel cell.
Figure 1B:
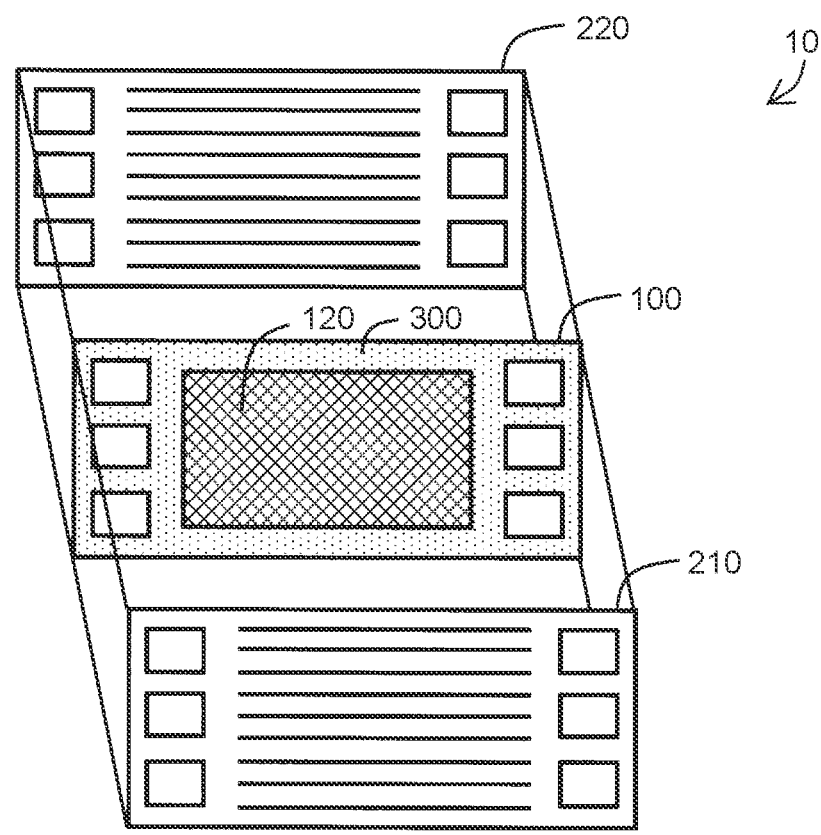
FIG. 1B is an explanatory view showing the configuration of the unit cell of the fuel cell.

FIG. 1A is a plan view of a unit cell 10 of a fuel cell in one embodiment of the present disclosure, and FIG. 1B is an exploded perspective view thereof. The unit cell 10 of the fuel cell has a rectangular outer shape in a plan view, and is composed of a MEGA plate 100, two separators 210, 220 holding the MEGA plate 100 therebetween front both sides thereof. The MEGA plate 100 is formed such that a resin frame 300 is joined around an entire outer circumference of a membrane electrode gas-diffusion-layer assembly 120 (MEGA). In the plan view, the MEGA 120 has a rectangular outer shape, and the resin frame 300 has a rectangular frame shape with an opening at a center portion thereof. The unit cell 10 of the fuel cell is formed along respective both short sides with manifold holes 11 to 13 and 21 to 23 used for an anode gas, a cathode gas, and a coolant. The plan shapes of the unit cell 10, the MEGA 120, and the resin frame 300 of the fuel cell are each not limited to a rectangular shape, and another shape (e.g. a circular shape, an oval shape, etc.) may be employed; however, a shape with both straight sides is preferable adopted.

Figure 2:
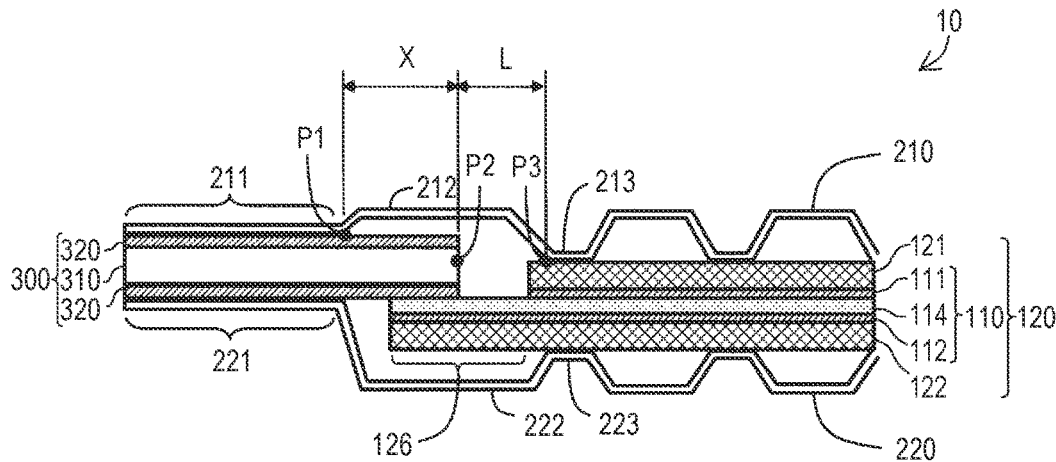
FIG. 2 is a cross-sectional view of the unit cell in a long side thereof.

FIG. 2 shows a cross-section taken along line 2-2 of FIG. 1. This cross section corresponds to a cross section of the unit cell 10 of the fuel cell that is cut at any position in a side of an outer shape of the membrane electrode gas-diffusion-layer assembly 120 in section vertical to a direction of this side. The MEGA 120 includes a membrane electrode assembly 110, a first gas diffusion layer 121 and a second gas diffusion layer 122 that are provided on both faces of the membrane electrode assembly 110. The membrane electrode assembly 110 includes an electrolyte membrane 114, and a first electrocatalyst layer 111 and a second electrocatalyst layer 112 that are formed on both faces of the electrolyte membrane 114. The electrolyte membrane 114 is formed by a solid polymer membrane, for example. An outer circumferential region 126 of the MEGA 120 is bonded to the resin frame 300. In this outer circumferential region 126, the first gas diffusion layer 121 and the first electrocatalyst layer 111 are omitted, so that the electrolyte membrane 114 is exposed, and the resin frame 300 is directly bonded onto the electrolyte membrane 114. Specifically, in the plan view, the first gas diffusion layer 121 is so formed as to have a smaller outer shape than that of the second gas diffusion layer 122, and likewise, the first electrocatalyst layer 111 is so formed to have a smaller outer shape than that of the second electrocatalyst layer 312. An inner circumference of the resin frame 300 is arranged apart from outer circumferences of the first gas diffusion layer 121 and the first electrocatalyst layer 111 located on the side where the resin frame 300 is joined to the electrolyte membrane 114. In a typical example, the first electrocatalyst layer 111 is a cathode electrode, and the second electrocatalyst layer 112 is an anode electrode. In an example of FIG. 2, the resin frame directly bonded onto the electrolyte membrane 114, but instead of this, the resin frame 300 may be bonded onto the first electrocatalyst layer 111 formed on the electrolyte membrane 114. It should be noted that the outer circumferential region 126 of the MEGA 120 hardly contributes to power generation, and thus it is preferable to omit the first electrocatalyst layer 111 in the outer circumferential region 126, as shown in the example of FIG. 2. In the outer circumferential region 126 of the MEGA 120, the second electrocatalyst layer 112 and the second gas diffusion layer 122 may further be omitted.

The resin frame 300 is a triple-layer film including a core layer 310, adhesive layers 320 formed on both faces of the core layer 310. As a material of the core layer 310, there may be used resin electrically insulating and excellent in gas-barrier property (gas impermeability). Specifically, PEN (polyethylene-naphthalate), PET (polyethylene-terephthalate), or SPS (syndiotactic polystyrene) may be used as the core layer 310, for example. Instead of using the triple-layer film as the resin frame 300, a single-layer resin film with no adhesive layers 320 thereon may be used. In this case, the bonding may be carried out by applying an adhesive agent between the resin frame 300 and the MEGA 120 and between the resin frame 300 and the separators 210, 220.

The two separators 210, 220 are each composed of a press-formed plate having protections and recesses. In the present specification, of the projections and the recesses of each of the separators 210, 220, portions in contact with the resin frame 300 and the MEGA 120 (i.e. MEGA plate 100 in FIG. 1) are referred to as projections, and portions apart from them are referred to as recesses. Slope portions extending from the projections to bottoms of the recesses are defined to belong to the recesses. In the following description, from the outer circumference side in order, first projections 211, 221, first recesses 212, 222, and second projections 213, 223 are involved in structural dimensions. The first projections 211 of the first separator 210 and the first projections 221 of the second separator 220 are so formed as to face each other. The same applies to the first recesses 212, 222 and the second projections 213, 223. The two separators 210, 220 may be formed by any other method than press-forming.

The outer circumferential region 126 of the MEGA 120 is disposed in spaces formed by the first recesses 212, 222 of the separators 210, 220 and is bonded to the frame 300 in these spaces. The projections 211, 221 located circumferentially outward of the first recesses 212, 222 are bonded to the resin frame 300 while holding the resin frame 300 therebetween. The second projections 213, 223 that are circumferentially inwardly adjacent to the first recesses 212, 222 hold the MEGA 120 therebetween.

In a cross section of FIG. 2, distances X, L are defined as follows.
(1) Distance X: a distance between a circumferentially innermost position P1 of a bonded portion of the resin frame 300 that is bonded to the first projections 211, 221 of the separators 210, 220, and a circumferentially inner end P2 of the resin frame 300. (2) Distance L: a distance between the circumferentially inner end P2 of the resin frame 300 and a circumferentially outermost position P3 of a held portion of the MEGA 120 that is interposed and held between the second projections 213, 223 of the separators 210, 220.

In a typical example, the distance X is within a range of 1 mm or more to 10 mm or less, while the distance L is within a range of 50 μm or more to 800 μm or less. As will be described later, from a viewpoint of preventing breakage of the electrolyte membrane 114 resulting from shrinkage of the resin frame 300, it is preferable to set the distance L to be great. However, if the distance L is excessively great, probability of breakage of the electrolyte membrane 114 becomes higher when the electrolyte membrane 114 is subjected to a tensile-stress applying cycle resulting from variation in pressure difference between the anode side and the cathode side. In this sense, it is preferable to set the distance L to be 600 μm or less.

Figure 3A:
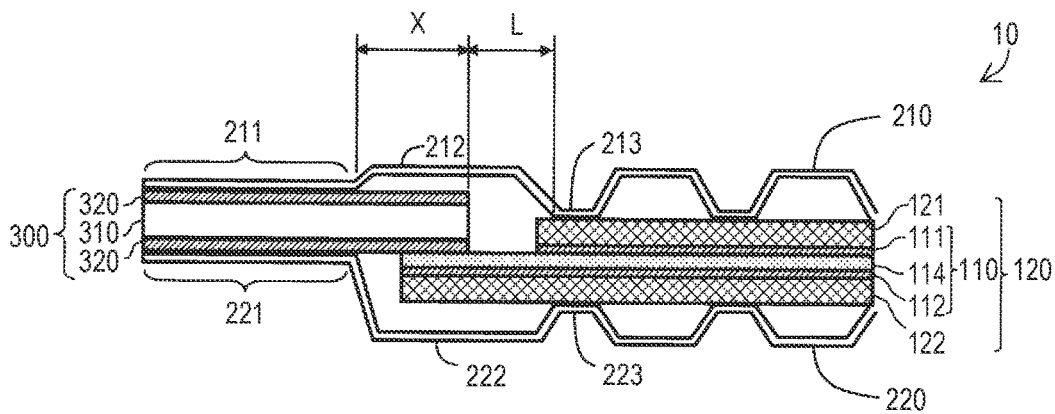
FIG. 3A is a conceptual view showing a state of the unit cell being subjected to a cooling-heating cycle.
Figure 3A:
Figure 3B:
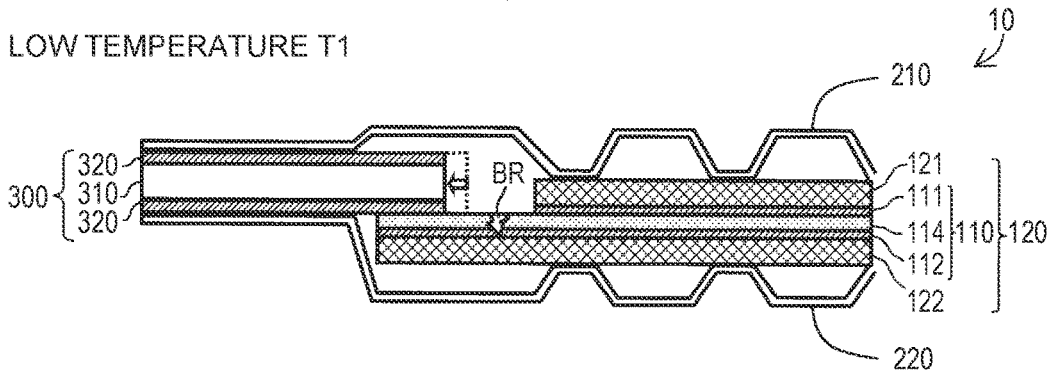
FIG. 3B is a conceptual view showing the slate of the unit cell being subjected to the cooling-heating cycle.

FIGS. 3A, 3B are conceptual drawings showing a state where the unit cell 10 of the fuel cell is subjected to a cooling-heating cycle. Here, a low temperature T1 is below the freezing point (typically −40° C.), and a high temperature T2 is 70° C. or more (typically 100° C.). A temperature difference ΔT (=T2−T1) from the low temperature T1 to the high temperature T2 is 100° C. or more, and typically 140° C. At this time, when the temperature drops from the high temperature T2 shown in FIG. 3A to the low temperature T1 shown in FIG. 3B, the resin frame 300 shrinks depending on the temperature difference ΔT to cause a tensile stress to the electrolyte membrane 114, so that breakage BR occurs in the electrolyte membrane 114 due to this tensile stress.

In order to prevent the breakage BR from occurring in the electrolyte membrane 114 when the resin frame 300 shrinks at the low temperature T1, if the above described distances X, L are set as dimensions at the high temperature T2, it is preferable to satisfy a relation of $$X \times \Delta T \times CTE_f < L \times t \quad (1),$$

where $CTE_f$ is an average coefficient of linear expansion of the resin frame 300 within the range of the low temperature T1 to the high temperature T2, t is a breaking elongation of the electrolyte membrane 114 at the low temperature T1. Preferably, the low temperature T1 is −40° C., the high temperature T2 is 100° C., and the temperature difference ΔT is 140° C.

The above formula (1) is a relation to be set up under the following assumptions.

<Assumption 1> No stress is present between the resin frame 300 and the electrolyte membrane 114 at the high temperature T2, and the electrolyte membrane 114 has no curvature (the electrolyte membrane 114 is disposed in a straight state at the high temperature T2).

<Assumption 2> When the temperature drops from the high temperature T2 to the low temperature T1, a tensile stress occurs between the resin frame 300 and the electrolyte membrane 114.

<Assumption 3> The electrolyte membrane 114 is supposed to be in a dry state (expansion due to generated water is ignored).

In an actual usage environment, since the electrolyte membrane 114 swells and expands with generated water, the electrolyte membrane 114 is not subjected to such a great tensile stress as shown in FIG. 3B even at the low temperature T1. In this sense, the above assumption 3 is severe enough to secure more allowance than that in the actual condition.

Meanwhile, the electrolyte membrane 114 also shrinks when the temperature drops from the high temperature T2 to the low temperature T1. Taking this point into consideration, it is preferable to use the following formula (2) instead of the above formula (1).

$$X \times \Delta T \times CTE_f < (1 - \Delta T \times CTE_m) L \times t \quad (2),$$

where $CTE_m$ is an average coefficient of linear expansion of the electrolyte membrane 114 within the temperature range of T1 to T2.

In the above formula (2), a value of L that satisfies this formula is greater than that in the above formula (1), and thus this condition becomes more severe as the condition to be satisfied by the dimension of the electrolyte membrane 114. Accordingly, from a viewpoint of more reliably preventing breakage of the electrolyte membrane 114, it is preferable to use the formula (2) rather than the formula (1).

When the electrolyte membrane 114 is tensed, the coefficient of linear expansion of the electrolyte membrane 114 tends to be smaller than that when the electrolyte membrane 114 is not tensed, while the coefficient of linear expansion of the electrolyte membrane 114 tends be smaller as the tension becomes greater. Hence, as the average coefficient of linear expansion $CTE_m$ of the electrolyte membrane 114, a value in the state where the electrolyte membrane 114 is not tensed is used. Specifically, if the electrolyte membrane 114 is formed by using Nafion®, the average coefficient of linear expansion $CTE_m$ thereof is approximately 60 ppm. In the structure of FIG. 2, strictly speaking, it is preferable to use not the average coefficient of linear expansion $CTE_m$ of the electrolyte membrane 114 but an average coefficient of linear expansion of a double-layer structure of the electrolyte membrane 114 and the second electrocatalyst layer 112. However, the thickness of the second electrocatalyst layer 112 is thin, and thus this coefficient of linear expansion is not so different from the coefficient of linear expansion of the electrolyte membrane 114; therefore, as shown in the above formula (2), it is sufficient to use the average coefficient of linear expansion $CTE_m$ of the electrolyte membrane 114.

Actually, when the temperature drops from the high temperature T2 to the low temperature T1, the separators 210, 220 also shrink; thus, taking this point into consideration, the following formula (3) is set up.

$$X \times \Delta T \times CTE_f - (X+L) \times \Delta T \times CTE_s < (1 - \Delta T \times CTE_m) L \times t \quad (3),$$

where $CTE_s$ is an average coefficient of linear expansion of the separators 210, 220 within the temperature range of T1 to T2.

In the above formula (3), a value of L that satisfies this formula is smaller than the value in the above formula (2); therefore, this condition becomes less severe as the condition to be satisfied by the dimension of the electrolyte membrane 114. Hence, from the viewpoint of more reliably preventing breakage of the electrolyte membrane 114, it is preferable to use the formula (2) or the (1) rather than the formula (3). As aforementioned, also in the above formula (1), the more severe condition than the actual condition is supposed, as with the above assumption 3 (the electrolyte membrane 114 is supposed to be in a dry state), and thus from a viewpoint of reducing breakage of the electrolyte membrane 114, this formula is a sufficiently effective formula.

The average coefficient of linear expansion $CTE_f$ of the resin frame 300 is given by the following formula (4).

$$CTE_f = (E1 \cdot t1 \cdot k1 + E2 \cdot t2 \cdot k2)/(E1 \cdot t1 + E2 \cdot t2) \quad (4)$$

where E1 is a Young's modulus of the core layer 310 at the low temperature T1, t1 is a thickness of the core layer 310, k1 is an average coefficient of linear expansion of the core layer 310 within the temperature range of T1 to T2, E2 is a Young's, modulus of the adhesive layers 320 at the low temperature T1, t2 is a total thickness of the two adhesive layers 320, k2 is an average coefficient of linear expansion of the adhesive layers 320 within the temperature range of T1 to T2.

This formula (4) is derived by assuming that there is no stress between the core layer 310 and the adhesive layers 320 at the high temperature T2, and the stress is balanced between the core layer 310 and the adhesive layers 320 when the temperature drops from the high temperature T2 to the low temperature T1. For example, if PEN is used as the core layer 310, the average coefficient of linear expansion $CTE_f$ of the resin frame 300 becomes a value of approximately 20 ppm to 60 ppm. It should be noted that if a single-layer film is used instead of the triple-layer film as shown in FIG. 2 as the resin frame 300, an average coefficient of linear expansion of this film itself is used.

FIGS. 4A and 4B are drawings showing examples of respective dimensions that satisfy the above formulae (1) and (2). The distance X is set to be within a range of 1 to 10 mm, and the distance L to be within a range of 50 to 800 μm. The low temperature T1 is set to be −40° C., the high temperature T2 to be 100° C., the temperature difference ΔT to be 140° C., the average coefficient of linear expansion $CTE_f$ of the resin frame 300 to be 38 ppm, a breaking elongation t of the electrolyte membrane 114 at the low temperature T1 to be 0.25, and an average coefficient of linear expansion $CTE_m$ of the electrolyte membrane 114 to be 60 ppm. In the drawings, each circle mark represents the distance L of interest that satisfies the formula (1) or the formula (2), and each cross mark represents the distance L of interest that does not satisfy the formula (1) or the formula (2). In these examples, it can be understood that if the distance L is 50 μm, the formula (1) or the formula (2) is not satisfied in some cases depending on the value of the distance X. On the other hand, if the distance L is 200 μm or more, both the formula (1) and the formula (2) are satisfied regardless of the value of the distance X. The result of the formula (2) in which the average coefficient of linear expansion $CTE_m$ of the electrolyte membrane 114 is taken into consideration is almost the same as the result of the formula (1) in which this average coefficient of linear expansion is not taken into consideration. From this result, it can also be understood that use of the formula (1) enables to attain a sufficient effect from the viewpoint of preventing breakage of the electrolyte membrane 114.

As aforementioned, in the present embodiment, the unit cell 10 of the fuel cell is configured to satisfy the formula (1) or the formula (2): therefore, even if the unit cell is used in an environment with a great temperature difference, it is possible to reduce possibility of breakage of the electrolyte membrane due to shrinkage of the resin frame when the temperature drops to a low level.

The present disclosure is not limited to the above embodiments, embodiment examples, and variations, and can be embodied in various forms without departing from the scope of the present disclosure. For example, it is feasible to appropriately replace or combine any of the technical features in the embodiments, the embodiment examples, and the variations corresponding to the technical features in the aspects described in "Summary of the Invention" in order to solve part or all of the above-mentioned problems or achieve part or all of the above-mentioned effects. Any of these technical features, if not explained as essential in the present specification, may be deleted as appropriate.

What is claimed is:

1. A unit cell of a fuel cell, the unit cell comprising:
   a membrane electrode gas-diffusion-layer assembly including a membrane electrode assembly having an electrolyte membrane and gas-diffusion layers provided on both faces of the membrane electrode assembly;
   a resin frame in a frame shape, the resin frame bonded to the membrane electrode gas-diffusion-layer assembly at an outer circumferential region of the membrane electrode gas-diffusion-layer assembly; and
   two separators holding therebetween the membrane electrode gas-diffusion-layer assembly to which the resin frame is bonded, each of the two separators having a first projection, a second projection, and a recess situated between the first and second projections, wherein
   no gas-diffusion layers are formed on the membrane electrode assembly in the outer circumferential region of the membrane electrode gas-diffusion-layer assembly to which the resin frame is bonded,
   the resin frame is bonded onto the electrolyte membrane or onto an electrocatalyst layer formed on the electrolyte membrane,
   the second projections are in contact with the membrane electrode gas-diffusion-layer assembly to which the resin frame is bonded, and the recesses are apart from the membrane electrode gas-diffusion-layer assembly,
   the outer circumferential region of the membrane electrode gas-diffusion-layer assembly to which the resin frame is bonded is disposed in a space partially bounded by the recesses of the two separators, the recesses disposed directly across the membrane electrode g diffusion-layer assembly from each other,
   the resin frame is interposed and held between, and is bonded to, the first projections of the two separators, the first projections disposed directly across the membrane electrode gas-diffusion-layer assembly from each other,
   the membrane electrode gas-diffusion-layer assembly is interposed and held between the second projections of the two separators, the second projections disposed directly across the membrane electrode gas-diffusion-layer assembly from each other, and
   in a cross section of the unit cell that is cut at any position in a side of an outer shape of the membrane electrode gas-diffusion-layer assembly in a section vertical to a direction of the side thereof, a relation of $X \times \Delta T \times CTE_f < L \times t$ is satisfied, where
   X represents a distance between a circumferentially innermost position of a bonded portion of the resin frame that is bonded to the first projections and a circumferentially inner end of the resin frame,
   L represents a distance between the circumferentially inner end of the resin frame and a circumferentially outermost position of a held portion of the membrane electrode gas-diffusion-layer assembly that is interposed and held between the second projections,
   ΔT represents a temperature difference from a low temperature T1 of −40° C. to a high temperature T2 of 100° C.,
   $CTE_f$ represents an average coefficient of linear expansion of the resin frame when a temperature of the resin frame is within a range of the low temperature T1 to the high temperature T2,
   t represents a breaking elongation of the electrolyte membrane when a temperature of the electrolyte membrane is at the low temperature T1, and
   the distances X, L represent dimensions when the temperature of the resin frame is at the high temperature T2.

2. The unit cell according to claim 1, wherein
   a relation of $X \times \Delta T \times CTE_f < (1 - \Delta T \times CTE_m) L \times t$ is satisfied, where $CTE_m$ represents an average coefficient of linear expansion of the electrolyte membrane when the temperature of the electrolyte membrane is within the range of the low temperature T1 to the high temperature T2.

* * * * *